Aug. 16, 1960

R. E. SMITH ET AL 2,949,260

LOAD FACTOR CUT-OUT SWITCH FOR AIRCRAFT

Filed Jan. 4, 1954

INVENTORS.
ROBERT E. SMITH
WILLIAM D. MULLINS, JR.
BY ROBERT H. CANNON, JR.
FRED W. MORGENTHALER

*William R Lane*

ATTORNEY

Aug. 16, 1960     R. E. SMITH ET AL     2,949,260
LOAD FACTOR CUT-OUT SWITCH FOR AIRCRAFT
Filed Jan. 4, 1954     2 Sheets-Sheet 2

*INVENTORS.*
ROBERT E. SMITH
WILLIAM D. MULLINS, JR.
BY ROBERT H. CANNON, JR.
FRED W. MORGENTHALER

*William R Lane*
ATTORNEY

United States Patent Office 2,949,260
Patented Aug. 16, 1960

2,949,260

LOAD FACTOR CUT-OUT SWITCH FOR AIRCRAFT

Robert E. Smith and William D. Mullins, Jr., Downey, and Robert H. Cannon, Jr., and Frederick W. Morgenthaler, Whittier, Calif., assignors to North American Aviation, Inc.

Filed Jan. 4, 1954, Ser. No. 402,098

12 Claims. (Cl. 244—77)

This invention relates to cut-out switches and particularly those sensitive to acceleration and rate of change of acceleration.

With the advent of automatic control of high speed aircraft, safety devices designed to be sensitive to the forces on the aircraft must be incorporated. If no such safety measures are taken, the aircraft may be guided into maneuvers causing greater stress than can be withstood by the airframe. Inasmuch as the device is designed to prevent overloads, it must be reliable in operation. Simplicity is desirable in such a device in that it increases reliability and reduces the physical proportions and the weight. A minimum of maintenance is also a desirable feature.

Under high speed conditions, the time factor is important. A cutout switch sensitive only to accelerations would provide no sense of impending high acceleration. To provide this, that is, to add a sense of anticipation, the switch should also be sensitive to rate of change of acceleration.

It is therefore an object of this invention to provide a safety device sensitive to the forces acting upon an aircraft.

Another object of this invention is to provide a cut-out switch to prevent the automatic control section from flying an aircraft into maneuvers which place excessive loads on it.

A further object of this invention is to provide an airborne device sensitive to acceleration and rate of change of acceleration.

A still further object of this invention is to provide a reliable, diminutive, and sensitive device designed to anticipate and detect excessive loading forces on an aircraft.

Other objects of this invention will become apparent from the following description taken in connection with the accompanying drawings, in which—

Figure 1:
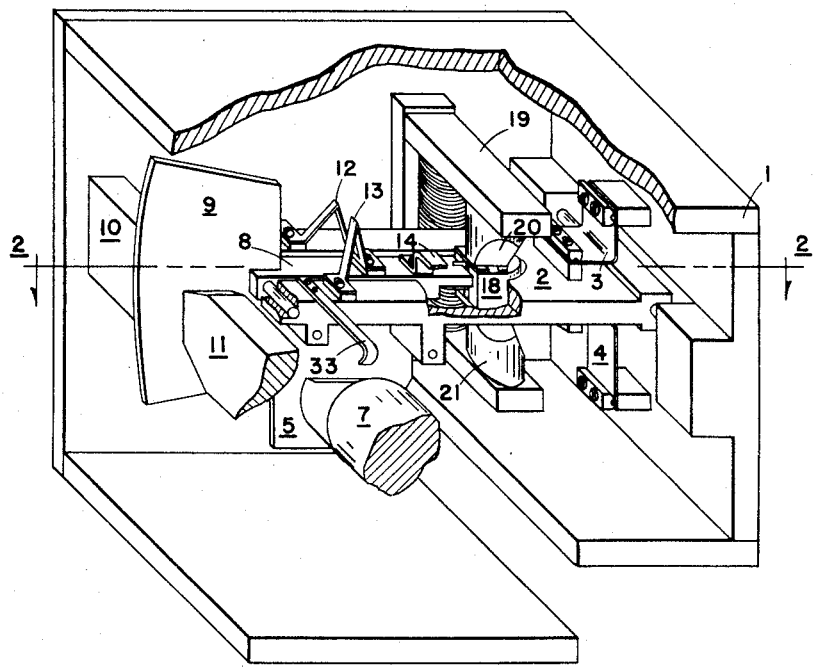
Fig. 1 is a perspective of the cut-out switch.

Referring now to Fig. 1, the device is enclosed within a reference frame 1. A first arm consisting of yoke 2 is pivotally attached to frame 1. Springs 3 and 4 restrain the motion of yoke 2 with reference to frame 1. Connected to yoke 2 is vane 5 disposed between magnets 6 (not shown) and 7 which are mounted on frame 1. Being of non-magnetic material, such as copper or silver, vane 5 in conjunction with magnets 6 and 7 operate to damp the motion of yoke 2 with reference to frame 1. Damping effect is achieved not by a force attempting to restore vane 5 within the magnetic field, but, rather, by a tendency of vane 5 to resist motion within the magnetic field. When vane 5 is moved, eddy currents are induced in the vane and they create a magnetic field which cooperates with the field of magnets 10 and 11 to oppose motion of vane 9. Pivoted at the outer end of yoke 2 is arm 8. Arm 8 is statically balanced about its pivot point. Vane 9 connected to arm 8 is also made of non-magnetic material and is disposed between magnets 10 and 11 which are connected to frame 1. Again, as with vane 5, vane 9 resists motion within the magnetic field of magnets 10 and 11. Whenever vane 9 is moved, eddy currents are induced therein and a magnetic field is created which cooperates with the field of magnets 10 and 11 to oppose motion of vane 9. Therefore, arm 8 is rate damped with respect to frame 1. It will be recognized that a magnetic path should be provided between magnets 6 and 7 and between magnets 10 and 11. Springs 12 and 13 operate to restrain the pivotal motion of arm 8 with respect to yoke 2. Upon arm 8 is a bracket 14 (broken away at the near end) which carries a switch contact (not shown). This is more clearly illustrated in Fig. 2. The motion of bracket 14 provides switch opening or closing.

Consider an instance, now, of acceleration of frame 1 in an upward direction. In Fig. 1, the outer end of yoke 2 will be deflected downwardly. While the acceleration is increasing upwardly, vane 9 will tend to resist any motion between magnets 10 and 11 and bracket 14 will move downwardly by two increments, one, dependent on the amount of deflection of yoke 2 and, two, the amount of pivoting of arm 8. In this manner, two factors determine the distance through which bracket 14 moves to close the switch contacts. These factors are acceleration indicated by the deflection of yoke 2 plus the rate of change of acceleration indicated by the amount of pivoting of arm 8.

Figure 3:
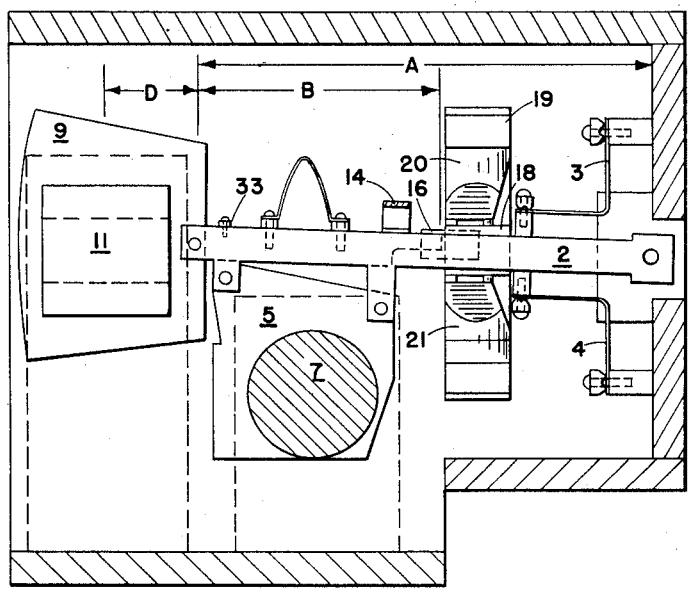
Fig. 3 is a section taken on line 3—3, Fig. 2.

The ratio in which deflections of bracket 14 due to acceleration and rate of change of acceleration are combined depends primarily upon the following constants of the system; the ratio of length B to length A, Fig. 3, spring constants, intensity of the magnetic field surrounding vane 9, and the ratio of length B to length D. Length D is measured from the pivot between the arms to the center of gravity of vane 9. It is apparent that by changing these constants and, particularly, the relative lengths of the arms of yoke 2 and arm 8, that acceleration and rate of change of acceleration can be detected in predetermined proportions. It is noted that acceleration alone, if sufficiently large, will close the switch contacts. This is also true of the rate of change of acceleration.

Figure 2:
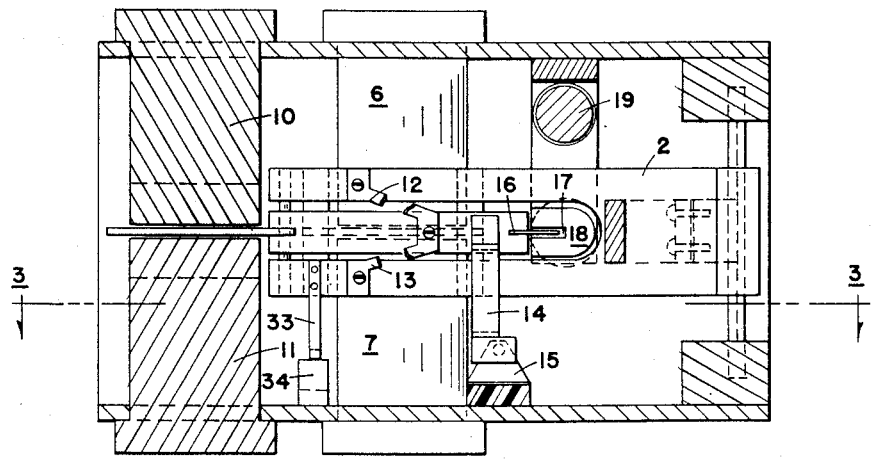
Fig. 2 is a top view taken on line 2—2, Fig. 1.

Referring now to Fig. 2, in order to assure positive contact is made between the upper contact carried on the outer end of bracket 14 and the lower contact carried on bracket 15, there is included on the inner end of arm 8 a magnetic vane 16 which traverses a slot 17 in a magnetic core 18. Electromagnet 19 supports magnetic core 18 between pole pieces 20 and 21. Non-magnetic shims insulate magnetic core 18 from pole pieces 20 and 21. Under conditions of acceleration and rate of change of acceleration, as the inner end of arm 8 rides sufficiently upwardly or downwardly, vane 16 is pulled against the shims by the magnetic field. In this way, once a predetermined amount of deflection is obtained because of acceleration and rate of change of acceleration, positive closing of the switch contacts carried by the brackets 14 and 15 is assured.

Fig. 3 is a section taken on line 3—3, in Fig. 2, and illustrates more clearly the connection of vane 5 to yoke 2.

Figure 4:
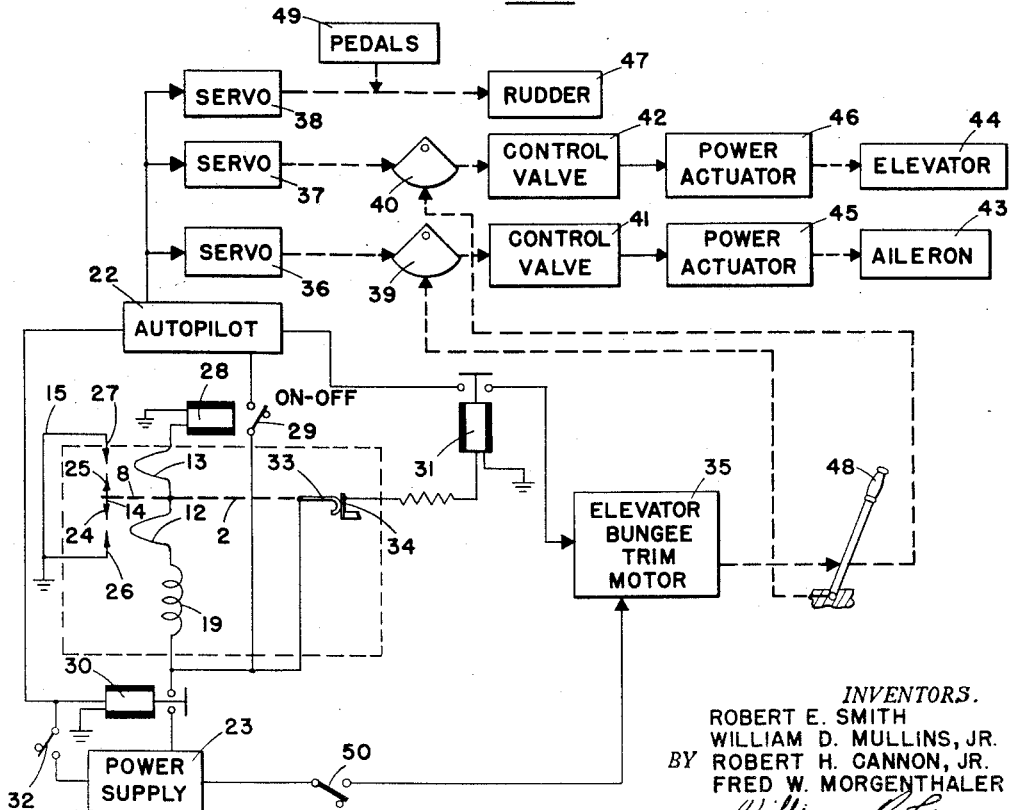
Fig. 4 is a schematic wiring diagram showing how the switch operates in conjunction with the autopilot.

In Fig. 4, an electrical schematic, the relationship between the cut-out switch and automatic control section or autopilot 22 is indicated. Assuming there is an "on-off" switch for the automatic control section, this device is readily adapted to operate a relay to close or open the "on-off" switch. The cut-out is indicated in Fig. 4 as being disposed between the D.-C. power supply 23 and the autopilot 22. The solenoid of electromagnet 19 is connected in series with the switch contacts 24 and 25 carried by bracket 14. The opposing contacts 26 and 27 carried by bracket 15 are connected to ground. As indicated, bracket 14 may ride upwardly or downwardly to close the switch contacts. The device, as constructed therefor, is sensitive to acceleration upwardly or downwardly. Referring momentarily to Fig. 1, it can be seen that springs 12 and 13 provide a convenient means of electrical jumper connection to bracket 14. Bracket 14 is connected through spring 13 to cut-out relay 28 which operates "on-off" switch 29 to disconnect the autopilot 22. From the diagram, it can be seen that under conditions of deflection of braket 14 either upwardly or downwardly, cut-out relay 28 becomes shorted, or de-energized, and switch 29 opens, turning the autopilot off. Once the autopilot is turned "off," holding relay 30 trips and power is disconnected from the load factor switch and the trim relay 31. The holding relay may be reset by momentary contact of reset switch 32.

The trim relay 31 is de-energized whenever the autopilot is turned "off" and holdout relay 30 is de-energized. Thus, when the autopilot is turned "off," the elevator trim motor is disconnected from the autopilot.

It may be desirable to turn the trim motor "off" depending on acceleration only so that the elevator cannot be trimmed to a high load factor which otherwise could occur during steady turns. This is accomplished by a wiper arm 33 mounted on yoke 2, sliding against contact post 34, Figs. 1 and 2. Fig. 4 indicates that a deflection of yoke 2 opens wiper 33 from post 34 and de-energizes relay 31. Thus, elevator bungee trim motor 35 is disconnected from the autopilot.

The system layout of Fig. 4 indicates autopilot 22 providing inputs to aileron servo 36, elevator servo 37 and rudder servo 38. Sector quadrants 39 and 40 receive the servo outputs and transmit them to aileron control valve 41 and elevator control valve 42, respectively. These valves control the aileron 43 and elevator 44 through actuators 45 and 46, respectively. The rudder 47 is controlled by servo 38. The stick 48 provides override control over the aileron and elevator through sector quadrants 39 and 40. The pedals 49 provide override control over the rudder.

Switch 50 provides for energizing the trim motor by the pilot at will.

In operation, acceleration and rate of acceleration together and separately are taken into account in disconnecting the autopilot and trim motor. The cut-out switch actuating signal is provided in the form of a mechanical motion which is the algebraic sum of acceleration and rate of acceleration. In addition, the trim motor is disconnected independently under predetermined acceleration.

Although the invention has been described and illustrated in detail, it is clearly understood that the same is by way of illustration and example only and is not to be taken by way of limitation, the spirit and scope of this invention being limited only by the terms of the appended claims.

We claim:

1. In an aircraft, means for detecting excessive forces on said aircraft comprising means sensitive to linear acceleration and means sensitive to the rate of change of linear acceleration, and means for summing the outputs of said means sensitive to acceleration and said means sensitive to the rate of change of acceleration.

2. In an aircraft, means for anticipating excessive forces on said aircraft comprising means for generating a signal proportional to linear acceleration, means for generating a signal responsive to rate of change of linear acceleration, and means combining said signals.

3. In an aircraft, means for detecting excessive forces on said aircraft comprising means for generating a motion proportional to linear acceleration, means for generating a motion proportional to rate of change of linear acceleration, and means providing a signal indicating the sum of said motions.

4. In an aircraft, having an automatic control section and at least partially automatically controlled, a safety device comprising means sensitive to the algebraic sum of acceleration and the rate of change of acceleration, and switch means actuated by said preceding means and operable to disconnect the control of said aircraft from said automatic control section.

5. An acceleration sensitive device comprising a reference frame, a first mass pivotally attached to said reference frame, restraining means between said first mass and said frame, a second mass pivotally attached to said first mass, restraining means between said second mass and said first mass, and means for rate damping said second mass with respect to said reference frame.

6. An acceleration sensitive device comprising a reference frame, a first arm pivotally attached at one end to said reference frame, means restraining the motion between said arm and said reference frame, a second arm pivotally balanced on said first arm, means for rate damping the motion of said second arm relative to said reference frame, and means restraining the motion of said second arm relative to said first arm.

7. An acceleration sensitive switch comprising a reference frame, a first arm pivotally attached to said frame, means restraining the motion of said first arm relative to said reference frame, a second arm pivotally balanced on said first arm, means for rate damping said second arm with respect to said reference frame, restraining means between said second arm and said first arm, and switch means actuated by said second arm.

8. An acceleration sensitive switch comprising a reference frame, a first arm pivotally attached at one end to said frame, means restraining the motion of said first arm relative to said reference frame, a second arm pivotally balanced at the other end of said first arm, restraining means between said second arm and said first arm, means damping the motion between one end of said second arm and said reference frame, and a switch comprising switch contact means operable by the other end of said second arm whereby said switch is operated according to acceleration plus the rate of change in acceleration.

9. An acceleration sensitive switch comprising a reference frame, a first arm pivotally attached at one end to said frame, a second arm pivotally balanced at the other end of said first arm, means restraining the motion of said first arm relative to said frame, means damping the motion between said first arm and said reference frame, means restraining the motion of said second arm relative to said first arm, means damping the motion of one end of said second arm relative to said frame, and switch means operated by the relative motion between the other end of said second arm and said reference frame.

10. In combination in an aircraft, control surfaces operable to guide said aircraft, manually operable means for actuating said control surfaces, autopilot means for controlling said control surfaces to cause said aircraft to execute predetermined maneuvers, and means predeterminately responsive to the algebraic sum of acceleration and rate of change of acceleration of said aircraft for rendering said autopilot means ineffective to control said actuating means whereby if said aircraft is presently or immidently subjected to excessive acceleration while controlled by said autopilot means, said autopilot is rendered ineffective and said aircraft must be guided manually to thereby prevent structural overload of said aircraft.

11. In combination in an aircraft, control surfaces operable to guide said aircraft, manually operable means for actuating said control surfaces, autopilot means for controlling said control surfaces to cause said aircraft to execute predetermined maneuvers, and means predeterminately responsive to acceleration and rate of change of acceleration of said aircraft comprising a reference frame, a first arm pivotally attached to said frame, means restraining the motion of said first arm relative to said reference frame, a second arm pivotally balanced on said first arm, damping means between said second arm and said reference frame, restraining means between said second arm and said first arm, and switch means actuated by said second arm, said switch means operable to render said autopilot means ineffective upon said control surfaces whereby said aircraft is operable by said manually operable means without interference from said autopilot.

12. In a moving vehicle, acceleration sensitive means for providing a signal having a magnitude and polarity indicative of linear acceleration of said vehicle, and means for varying the magnitude of said signal in accordance with the magnitude and polarity of the rate of change of said linear acceleration.

References Cited in the file of this patent

UNITED STATES PATENTS

| | | |
|---|---|---|
| 2,017,072 | Minorsky | Oct. 15, 1935 |
| 2,302,670 | Buchanan | Nov. 24, 1942 |
| 2,487,793 | Esval et al. | Nov. 15, 1949 |
| 2,508,961 | McNerney | May 23, 1950 |
| 2,672,334 | Chenery | Mar. 16, 1954 |
| 2,702,186 | Head et al. | Feb. 15, 1955 |
| 2,776,829 | Cockram | Jan. 8, 1957 |